(12) United States Patent
Tanaka et al.

(10) Patent No.: US 6,252,357 B1
(45) Date of Patent: Jun. 26, 2001

(54) SELF-BALLASTED FLUORESCENT LAMP AND LIGHTING FIXTURE

(75) Inventors: Toshiya Tanaka, Yokohama; Tsutomu Araki, Tokyo; Hajime Osaki, Yokosuka; Shinya Hakuta, Yokohama; Kazuyuki Uratani, Tokyo; Fuminori Nakaya, Miura, all of (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 0 days.

(21) Appl. No.: 09/282,160

(22) Filed: Mar. 31, 1999

(30) Foreign Application Priority Data

Mar. 31, 1998 (JP) .................................................. 10-087565
Jun. 30, 1998 (JP) .................................................. 10-185372
Jan. 28, 1999 (JP) .................................................. 11-019699

(51) Int. Cl.[7] .................................................. H05B 37/02
(52) U.S. Cl. ........................ 315/209 R; 315/225; 315/94; 315/99
(58) Field of Search .................. 315/209 R, 225, 315/94, 98, 99, 100, 112, 116, 224, 200 R, 106

(56) References Cited

U.S. PATENT DOCUMENTS

| | | | |
|---|---|---|---|
| 4,547,706 | * | 10/1985 | Krummel .............................. 315/226 |
| 4,554,487 | * | 11/1985 | Nilssen ................................. 315/224 |
| 5,051,661 | * | 9/1991 | Lee ....................................... 315/225 |
| 5,097,180 | * | 3/1992 | Ignon et al. ....................... 315/200 A |
| 5,430,641 | * | 7/1995 | Kates .................................... 363/133 |
| 5,493,180 | * | 2/1996 | Bezdon et al. ......................... 315/91 |
| 5,629,586 | * | 5/1997 | Yasuda et al. ......................... 315/46 |
| 5,636,111 | * | 6/1997 | Griffin et al. .......................... 363/37 |
| 5,744,912 | * | 4/1998 | So ........................................ 315/127 |
| 5,777,439 | * | 7/1998 | Hua ...................................... 315/225 |
| 5,793,276 | * | 8/1998 | Tosaka et al. ..................... 338/22 R |
| 5,808,422 | * | 9/1998 | Venkitasubrahmanian et al. 315/225 |
| 5,883,473 | * | 3/1999 | Li et al. ............................... 315/225 |
| 5,930,126 | * | 7/1999 | Griffin et al. .......................... 363/37 |
| 5,939,835 | * | 8/1999 | Takeda et al. .................. 315/209 R |
| 5,977,692 | * | 11/1999 | Itaya et al. ............................. 313/37 |
| 5,982,111 | * | 11/1999 | Moisin ................................. 315/283 |

* cited by examiner

*Primary Examiner*—Don Wong
*Assistant Examiner*—Tuyet T. Vo
(74) *Attorney, Agent, or Firm*—Pillsbury Winthrop LLP

(57) ABSTRACT

The present invention provides self destruct arrangements for self ballasted fluorescent lamps and lighting fixtures using them. The ballast power supply includes at least one element that breaks down at high temperature. The lamp arrangements are constructed such that there is close proximity between at least one electrode of the lamp and the breakdown element of the ballast power supply. In one embodiment the breakdown element is a FET switch. In another embodiment, the breakdown element is a capacitor.

9 Claims, 9 Drawing Sheets

SELF-BALLASTED FLUORESCENT LAMP AND LIGHTING FIXTURE

INCORPORATION BY REFERENCE

This application claims priority from Japanese Patent Application 10-87565 filed Mar. 31, 1998, 10-185372 filed Jun. 30, 1998, and 11-19699 filed Jan. 28, 1999, the contents of which are incorporated herein by reference.

BACKGROUND OF THE INVENTION

1. Field of the Invention

The present invention relates to self ballasted fluorescent lamps and to lighting fixtures using such lamps.

2. Description of Related Art

Self ballasted fluorescent lamps having fluorescent arc tubes are known. Such self ballasted fluorescent lamps generally have a ballast power supply and an E form base for screwing into a conventional incandescent light socket. The ballast power supply utilizes commercial AC power to provide the high frequency power needed to drive a fluorescent arc tube.

There are operational and safety hazards associated with the operation of fluorescent arc tubes when they reach the end of their useful lives. Near the end of a tube's life, it becomes difficult to operate the tube even when applying the rated voltage. As the tube ages, its electrodes no longer emit as well. The effective resistance of the tube increases. The current being forced through the tube causes the voltage drop across the tube to rise and the electrodes and tube overheat, sometimes to a very dangerous degree. There is a risk of fire and a risk that the tube will explode. Before any dangerous condition arises, it is desirable to stop operation of the ballast power supply and end operation of the tube.

Japanese Patent Laid-open No. 10-189279 discloses a ballast power supply driven fluorescent tube arrangement. The ballast power supply includes a switch that self-destructs at the end of tube life when the current flowing through the switch exceeds a predetermined amount. The switch opening stops the power supply. However, stopping the lamp is not reliable based solely on the current flow through the switch, in part because of wide variation in the electrical characteristics of the switch.

SUMMARY OF THE INVENTION

Accordingly, the present invention provides various self ballasted fluorescent lamps and lighting fixtures using them. Our arrangements have a ballast power supply that self-destructs at the end of the useful life of the lamp. However, our self-destruct arrangements depend not just on current flow through a switch element, but also upon sensing an increasing temperature from the tube itself and/or the electrodes of the tube. Our ballast power supply generates the high frequency power needed to operate the lamp and our self destruct arrangements stop operation of the ballast power supply in the early stages of the fluorescent lamp's end of useful life.

Lamps according to the present invention have a base with a plug portion for receiving commercial power. The base contains a circuit board on which the ballast power supply components are formed. At least a portion of the circuit board is near at least one electrode of the arc tube so that there is heat transfer from the electrode to the ballast power supply. The base covers part of the tube and the ballast power supply. In at least one embodiment of the invention the ballast power supply includes a switch element, preferably constituted by a FET, that is destroyed by a temperature rise of the tube and/or the tube's electrode that occurs at the end of life of the tube.

When the fluorescent arc tube reaches it's end of life there is a so-called half wave discharge. The striking voltage of the fluorescent arc tube increases, and electrode temperature rises. The temperature of the switch element rises due to its proximity to the electrode. The switch element fails completely when a certain predetermined temperature is reached. This switch element failure stops operation of the ballast power supply early enough to avoid the risks associated with tube and electrode overheating that occur at the end of life of fluorescent arc tube.

In another embodiment, a capacitor in the ballast power supply is made of a material that breaks down at high temperature. Overheating of the electrode causes this capacitor to break down and stop operation of the ballast power supply.

Various embodiments of the invention will be described in detail with reference to the drawings.

BRIEF DESCRIPTION OF THE DRAWINGS

The invention will be described in more detail below with reference to to the following figures.

DETAILED DESCRIPTION OF THE PREFERRED EMBODIMENTS

Preferred embodiments of the present invention will be described with reference to the accompanying drawings.

Figure 1:
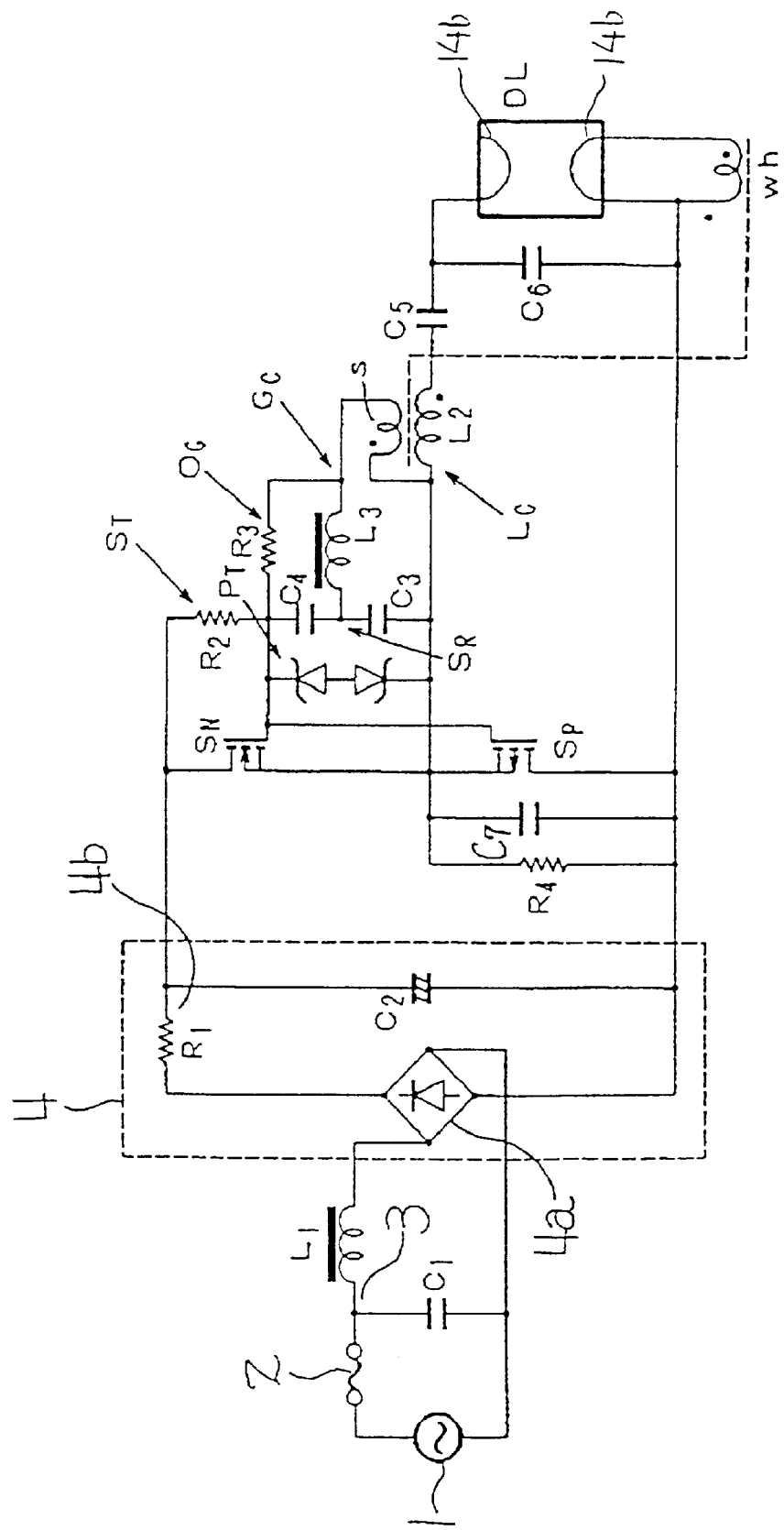
FIG. 1 is a circuit diagram showing a first embodiment of a self ballasted fluorescent lamp of the present invention.

A first embodiment of the present invention will be explained with reference to FIGS. 1–4. FIG. 1 is a circuit diagram showing a self ballasted fluorescent lamp according to the invention.

An AC power supply 1 is a commercial 100 V AC power supply. An over-current fuse 2 may be included for protection. For example, fuse 2 may be formed on a printed circuit board as a part of its wiring pattern that will melt when excessive current flows. A noise prevention circuit 3 includes an inductance L1, which is connected in series between the AC power supply 1 and a rectifier DC power supply 4, and a capacitor C1 which is connected in parallel with the AC power supply 1. The noise prevention circuit 3 prevents high frequency signals from flowing into the commercial power supply. DC power supply 4 is a full wave bridge type including a shaping circuit 4a and a smoothing circuit 4b. Smoothing circuit 4b includes a series resistance R1 and a smoothing capacitor C2. The rated service power of the self ballasted fluorescent lamp is 13W, the capacitance of the smoothing capacitor C2 is 16 $\mu$F. However, the capacitance is set to 27 $\mu$F when the rated service power is 23 W. A resistance value of several ohms or less for resistance R1 reduces the charging current flowing into the smoothing capacitor C2, and reduces higher harmonic components produced by the circuit.

The drain of an N channel FET SN is connected to positive output of smoothing capacitor C2. The source of a P channel FET SP is connected to the source of N channel FET SN. The drain of P channel type FET SP is connected to the negative terminal of smoothing capacitor C2. A gate circuit GC for FETs SN and SP includes feedback element s, a series connected resonance circuit SR, and gate voltage output circuit OG. Feedback element s is magnetically coupled to a current-limiting inductance L2. The resonance circuit SR is formed by an inductance L3 and a series connected capacitor C3. Opposite ends of the series connected components are connected to opposite ends of feedback elements.

Gate voltage output circuit OG is formed so that the resonance voltage which appears across the capacitor C3 is transferred through a capacitor C4. The other end of capacitor C4 is connected to the gates of both FETs SN and SP. Furthermore, the end of the capacitor C3 not connected to inductance L3 is connected with the source of both FETs SN and SP. Thus, the resonance voltage which appears across the capacitor C3 is applied between the gates of FETs SN and SP and the source of each FET SN and SP through gate voltage output circuit OG.

A starting circuit ST includes resistances R2, R3, and R4. One end of resistance R2 is connected to one end of resistance R3 and capacitor C4 at the gates of FETs SN and SP. The other end of resistance R2 is connected to the positive terminal of smoothing capacitor C2. The other end of resistance R3 is connected to the inductance L3 and feedback element s. Resistance R4 is connected between the node between FETs SN and SP and the negative terminal of smoothing capacitor C2.

A gate protection circuit PT includes Zener diodes connected in series with reverse polarity which are connected to gate voltage output circuit OG.

The fluorescent lamp circuit LC includes a fluorescent lamp DL having electrodes 14b, the lamp being a load of the circuit, a current-limiting inductance L2, coupling capacitor C5, and a resonance capacitor C6. The rated service power of the self ballasted fluorescent lamp containing the fluorescent lamp circuit LC is 23 W. One electrode of the fluorescent lamp DL is connected to the end of the capacitor C5. The fluorescent lamp circuit LC forms a series connected resonance circuit which consists of the current-limiting inductance L2, capacitor C5, and capacitor C6.

A filament heating winding wh is connected in parallel with the other electrode of lamp DL. The filament heating winding wh is magnetically coupled to the current-limiting inductance L2, and it heats the electrode. Alternatively, the filament heating winding wh can be eliminated. To heat the lower electrode of lamp DL, the lower terminal of resonance capacitor C6 may be disconnected from the power supply side terminal of the lower electrode and connected instead to the non-power supply side terminal of the lower electrode. The second arrangement produces results similar to the first arrangement. The filament electrode is heated by the current which flows through the resonance capacitor C6. The capacitor C7 is connected between the source and drain of FET SP. Capacitor C7 smoothes the switching of FET SP.

Figure 2:
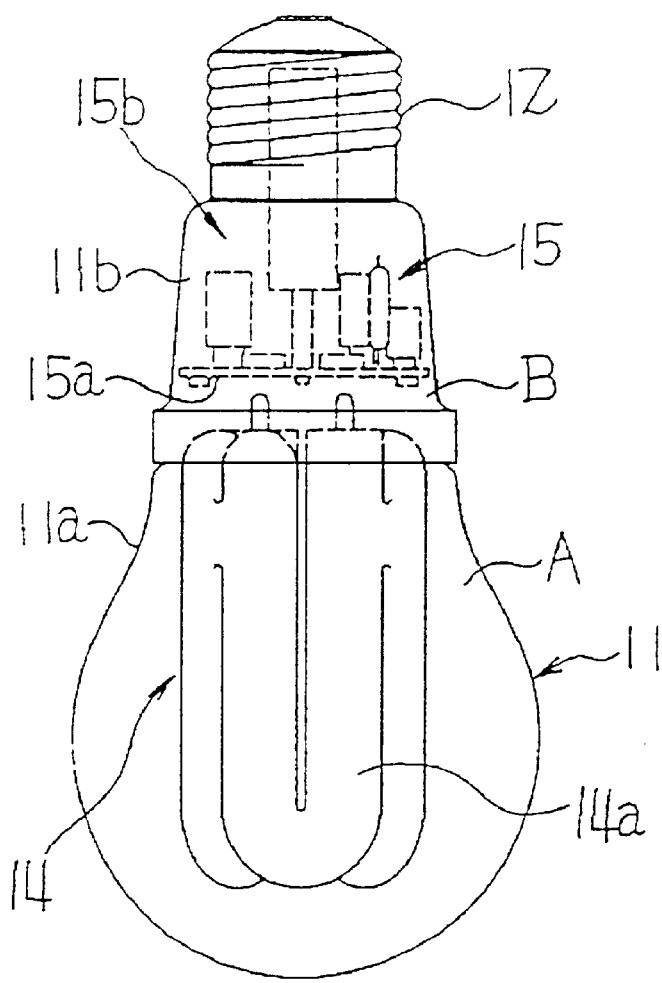
FIG. 2 is a front view, partially in section, of a first embodiment of a self ballasted fluorescent lamp according to the present invention.
Figure 3:
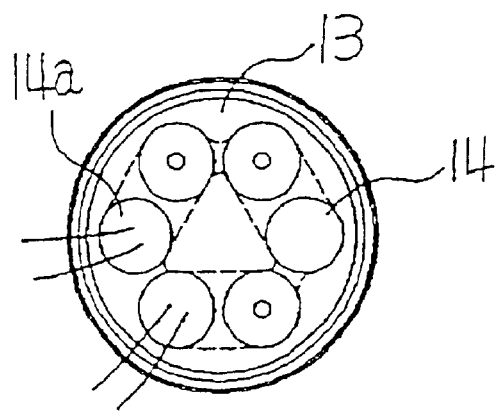
FIG. 3 is a cross sectional view of a first embodiment of a self ballsted fluorescent lamp according to the present invention.
Figure 4:
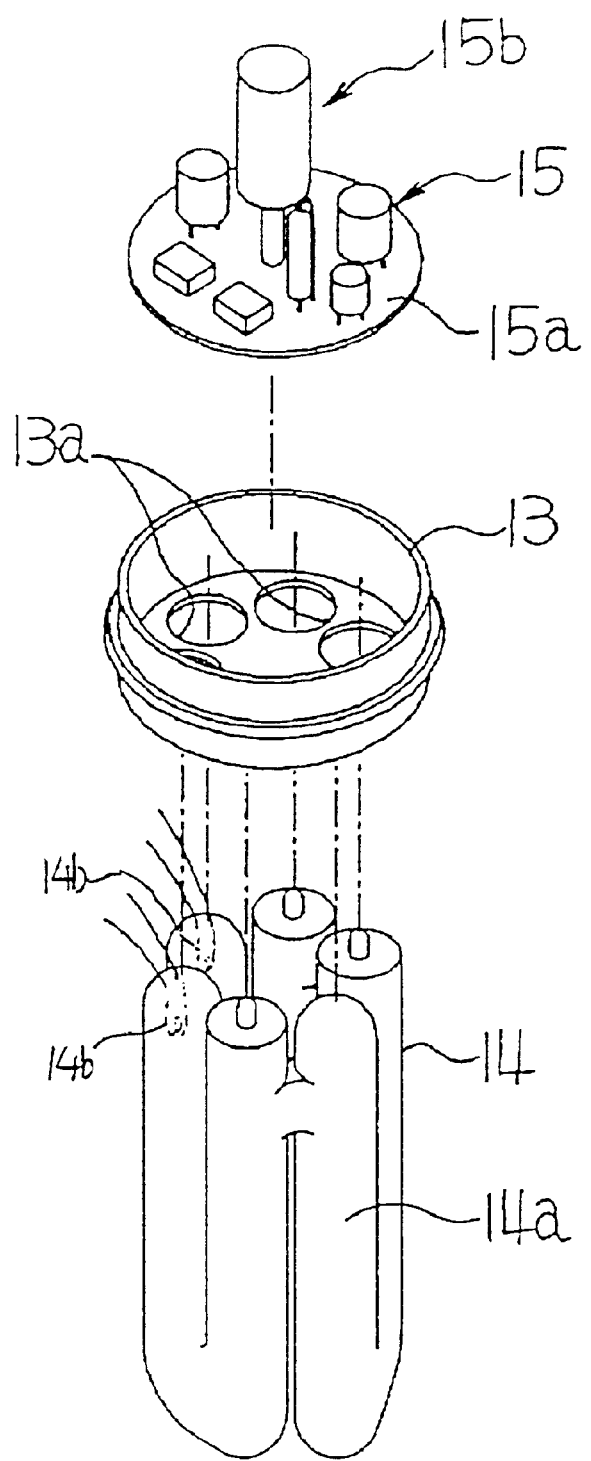
FIG. 4 is an exploded perspective view of a first embodiment of a self ballasted fluorescent lamp according to the present invention.

FIGS. 2–4 show the lamp structure of the first embodiment. The rated service power of this self ballasted fluorescent lamp is 13 W and has a height including the base of about 110–125 mm. The vessel 11 includes a transparent globe 11a and shading base 11b. The shape of globe 11a is similar to that of an incandescent light bulb. The maximum diameter is about 60 mm. Shading base 11b is cup-shaped and is made of synthetic resin. The shading base 11b is equipped with a base 12, and transparent globe 11a is attached at the open end of shading base 11b using silicone adhesives 17.

A partition 13 divides the inside of the vessel 11 into a luminescence chamber A and a circuit receiving chamber B. Fluorescence arc tube holes 13a are formed in the partition 13.

The fluorescent arc tube 14 includes a bulb 14a, a pair of electrodes (not shown), a phosphor layer and a discharge medium. The bulb 14a is a long slender glass pipe with a diameter of 10 mm, thickness of 0.8 mm, length of 120 mm, bent so as to have three connected "U" shape portions.

The electrodes are hot cathodes with one at each end of the fluorescent arc tube 14. The height of the fluorescent arc tube 14 is about 55 mm, and the length of the discharging gap is 250 mm. Each electrodes 14b, 14b are hot cathodes. When the fluorescent arc tube 14 operates at a lamp power of 7–15 W, it is desirable to have a luminous flux of more than 700 lm and that the lamp have an efficiency of 60 (lm/W). For this embodiment, input power is 14 W, and supplied the power is 12.5 W (lamp current is 235 mA and the ramp voltage is 54 V). This arrangement has a luminous flux 810 lm.

A phosphor layer is formed on the inside of bulb 14a. The discharge medium includes a rare gas at a pressure of 0–10 torr. For example, the discharge medium can include mercury and argon. Both ends of the fluorescent arc tube 14 are inserted in fluorescent arc tube hole 13a of the partition 13 from the luminescence chamber A side, and the tube 14 is fixed to the partition 13 with silicone adhesives 17 so as to be supported and arranged in luminescence chamber A of the vessel 11.

The self-ballast lighting circuit 15 includes circuit parts 15b mounted on a printed circuit board 15a. Base 12 is connected to the input end of the self ballast lighting circuit 15, and the output end of the lighting circuit 15 is connected to the electrodes of the fluorescent arc tube 14.

Lighting circuit unit 15 comprises the fluorescent lamp lighting circuit shown in FIG. 1. The fluorescent arc tube 14 is equivalent to the fluorescent lamp DL in FIG.1. The base 12 is connected to the input end of self ballast lighting circuit 15, and the output end of the lighting circuit unit is connected to electrodes 14b of the fluorescent arc tube 14.

Next, the operation of this embodiment is explained. When AC power is supplied from the AC power supply 1, a DC voltage smoothed by the rectifier DC power supply 4 appears across smoothing capacitor C2. The DC voltage is applied across the drains of FET SN and FET SP. However, since no gate voltage has been applied to FETs SN and SP, FETs SN and SP remain in their OFF states.

The starting circuit ST also receives the DC voltage. Therefore, a divided voltage appears across resistance R3 based on the values of resistances R2, R3, and R4. This creates a positive voltage across each gate and source of FET SN. Consequently, N channel type FET SN is turned on. However, since the necessary gate voltage is of a reverse polarity, the voltage applied between the gate and source of P channel type FET SP causes this FET to remain in the OFF state.

When the N channel type FET SN turns on, current flows through the fluorescent lamp circuit LC including current-limiting inductance L2, capacitor C5, and capacitor C6. The series connected resonance circuit of the current-limiting inductance L2, the capacitor C5, and the capacitor C6 resonates, and the terminal voltage of the resonance capacitor C6 becomes high. When current flows through the current-limiting inductance L2, a voltage is magnetically induced across feedback element s and filament heating winding wh. As a result of the voltage induced across feedback element s, the resonance circuit SR starts to resonate. The resonance causes a negative voltage to appear across the capacitor C3 which is regulated by the gate protection circuit PT. The negative voltage is applied across respective gates and sources of the two FETs through the gate protection circuit PT. As a result, the P channel type FET SP is turned on. However, the negative voltage turns off N channel type FET SN. As a result of the electromagnetic energy accumulated in the current-limiting inductance and the electric charge stored in the capacitor C6, the current flows in the opposite direction when P channel type FET SP turns on. Since the current-limiting inductance L2 induces an AC voltage in the filament heating winding wh in the fluorescent lamp DL, the corresponding electrode of the lamp is heated.

A high resonance voltage appears across the resonance capacitor C6, causing the fluorescent lamp DL to be lit. Since the same current which flowed through the starting circuit ST to feedback element s also flows when P channel type FET SP turns on, N channel type FET SN turns on again and P channel type FET SP turns off. Since FETs SN and SP alternately turn on and off, the fluorescent lamp DL is lit by high frequency current.

N channel type FET SN and P channel type FET SP are complementary switching elements forming a complementary switch circuit which generates high frequency voltage. The complementary switch circuit applies a predetermined gate voltage in common to N channel type FET and P channel type FET. In this case, positive voltage is applied to turn on the N channel type FET and a negative voltage is applied to turn on the P channel FET.

Using half wave discharge, even at rated striking voltage, it is difficult to operate the fluorescent arc tube 14. If the striking voltage is increased, electrode temperature will rise, causing FET SP to break down.

Secondary voltage from self ballast lighting circuit 15 continues to be applied to the fluorescent arc tube 14 until it starts to arc discharge. The secondary voltage is the resonance voltage which appears at both ends of the resonance capacitor C6. Ballast 15 includes a self-destruct feature. The P channel FET SP breaks down under certain operational conditions. In fact, it is easy to destroy the P channel FET of the complementary switch circuit.

There is defined a set time. The set time is longer than the time it takes for the fluorescent arc tube 14 to properly arc discharge. However, the set time is shorter than the time it takes to destroy the fluorescent arc tube 14 from half wave discharge. By predetermining the set time in this manner, as long as there is useful life in fluorescent arc tube 14 so that it can arc discharge, circuit 15 will not self-destruct.

Figure 5:
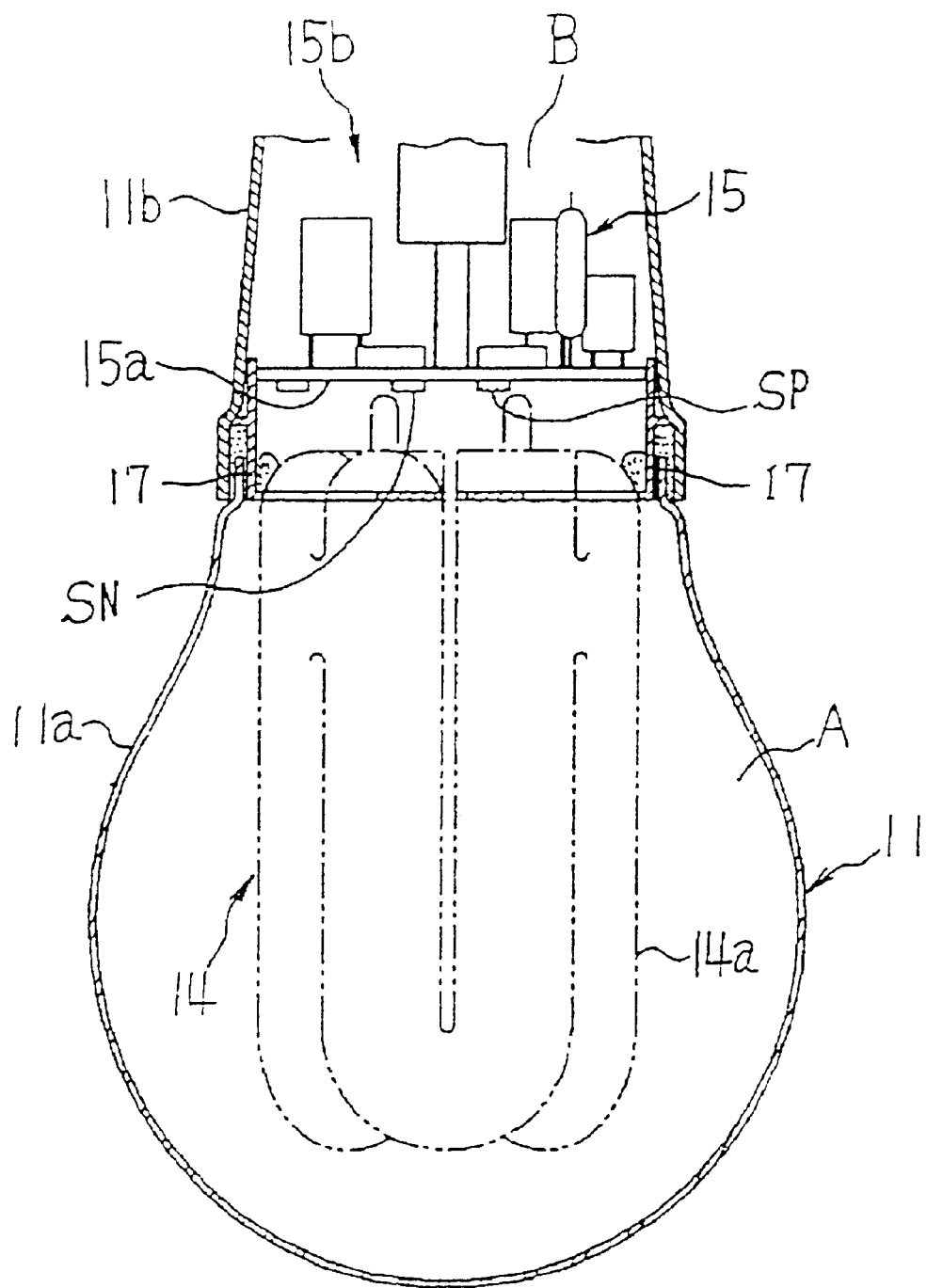
FIG. 5 is a longitudinal sectional view of a second embodiment of a self ballasted fluorescent lamp according to the present invention.

FIG. 5 is a longitudinal sectional view of a second embodiment of a self ballasted fluorescent lamp according to the present invention. This embodiment is the same as the first embodiment except as described below and common elements having the same reference numeral will not be described.

Circuit board 15a is printed circuit board attached in base 11b so that the end of the fluorescent arc tube 14 may be covered. Electrodes are located at the ends of fluorescent arc tube 14. The mounting of P channel FET SP and N channel FET SN is positioned near fluorescent arc tube 14 on circuit board 15a. Therefore, it is easy for the mount and the FETs to receive the heat from the tube's electrodes. The diameter of circuit board 15a is 35 mm. The maximum width of the fluorescent arc tube is 34 mm.

Figure 6:
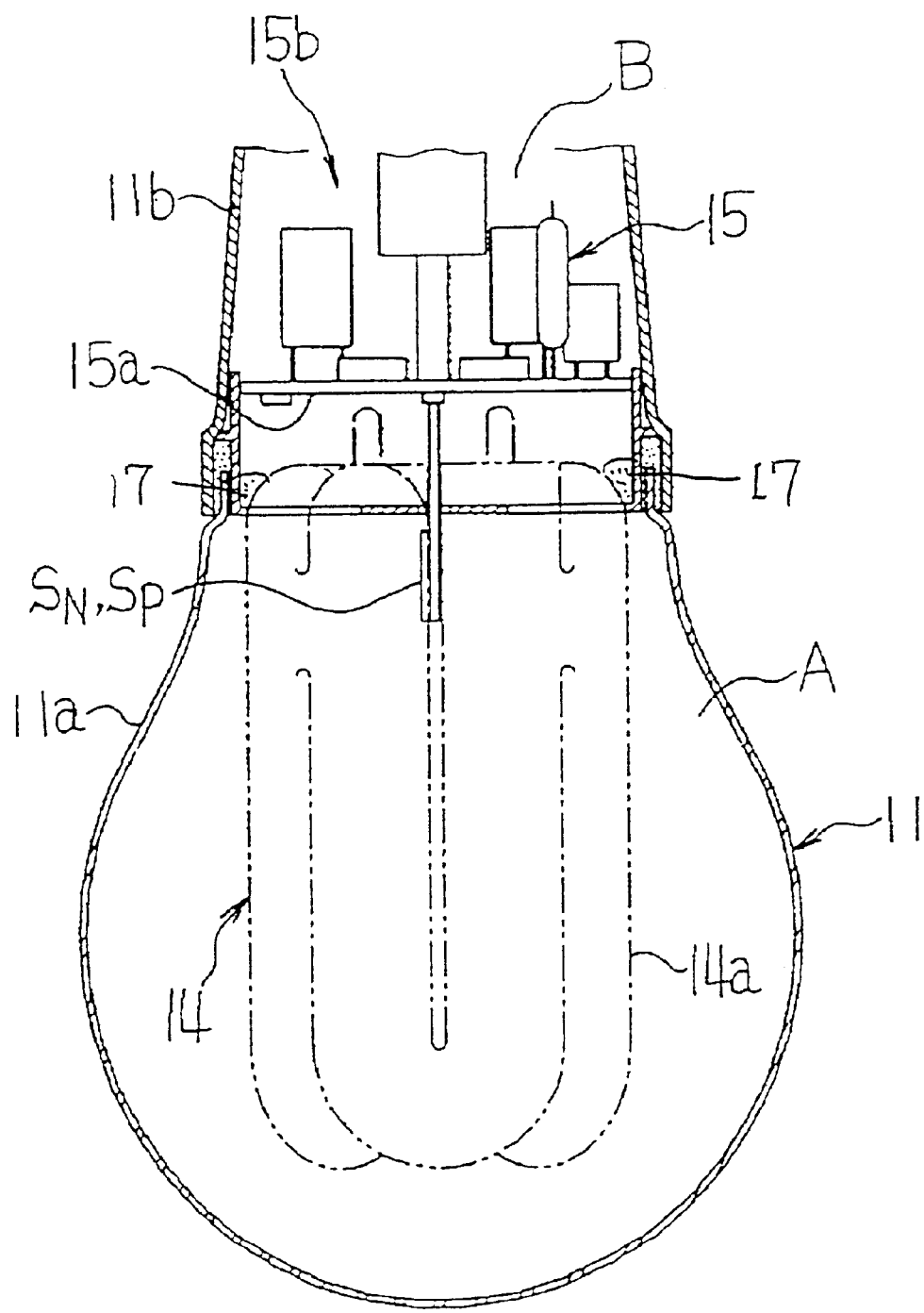
FIG. 6 is a longitudinal sectional view of a third embodiment of a self ballasted fluorescent lamp according to the present invention.

A third embodiment of the present invention is explained with reference to FIG. 6, which is a longitudinal sectional view of the self ballasted fluorescent lamp. In this embodiment, one or more of P channel FETs SP and N channel FETs SN are positioned near the filament heating winding wh, not positioned in chamber B but rather positioned in luminescence chamber A.

Figure 7:
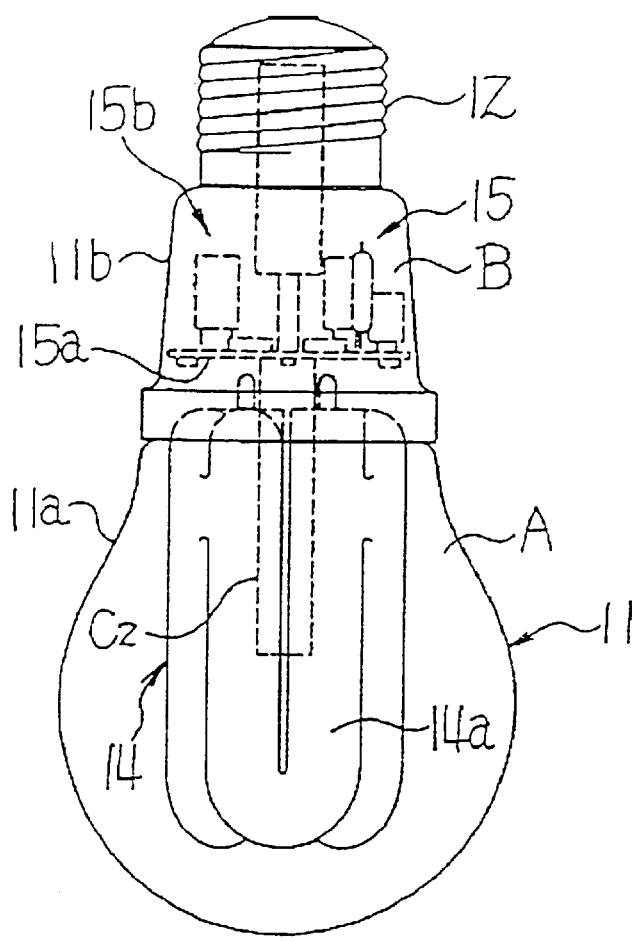
FIG. 7 is a front view of a fourth embodiment of a self ballasted fluorescent lamp according to the present invention.
Figure 8:
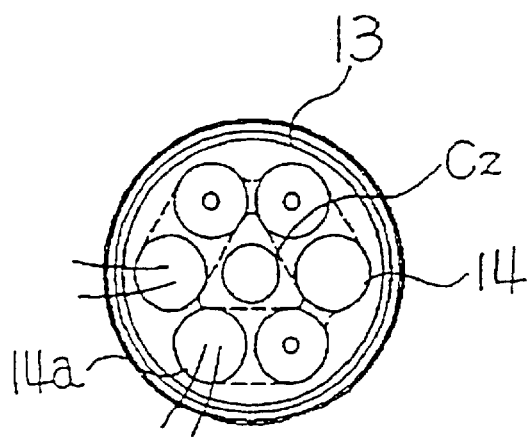
FIG. 8 is a cross sectional view of a fourth embodiment of a self ballasted fluorescent lamp according to the present invention.

A fourth embodiment of the invention is explained with reference to FIG. 7 (front) and 8 (cross section). The electrolytic capacitor C2 of smoothing circuit 4b is located near the filament heating winding wh not received in chamber B but rather in luminescence chamber A. The electrolytic capacitor C2 is enclosed by the fluorescent arc tube 14 as shown in FIG. 8.

The self-destruct circuit arrangement is based upon the time it takes for the electrolytic capacitor 02 to break down when the secondary voltage is applied to it. This breakdown time is longer than the normal time required for fluorescent arc tube 14 to arc discharge. However it is shorter than the time it takes for the secondary voltage to destroy fluorescent arc tube 14 if it is not properly discharging. This embodiment takes advantage of the space surrounding fluorescent arc tube 14, so it can be made quite small.

Figure 9:
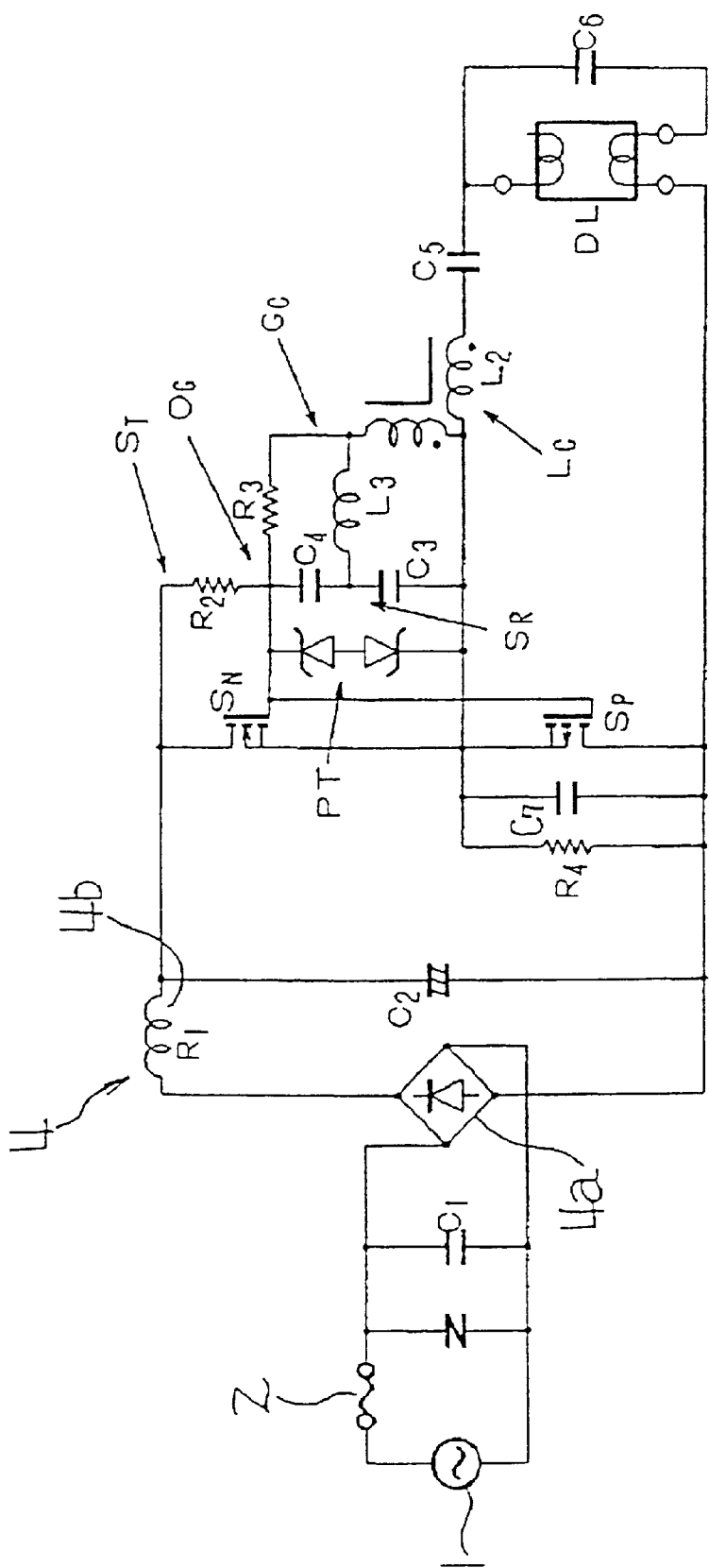
FIG. 9 is a circuit diagram showing a fifth embodiment of a self ballasted fluorescent lamp of the present invention.

A fifth embodiment of the invention is described with reference to FIG. 9 which is a circuit diagram showing the circuit 15.

An in-series resonance loop of the complementary switch circuit is formed by current-limiting inductance L2, coupling capacitor C5, and resonance capacitor C6. The self-destruct arrangement includes the in-series connection of the filament of the fluorescent arc tube 14 and the resonance loop of the complementary switch circuit. The self-destruct destroys the filament to the life end. Since the resonance loop will be interrupted if the filament breaks, the complementary switch circuit will be stopped.

Self ballast lighting circuit 15 may be made to heat only one filament of the arc tube 14 before it is started. The crest factor of circuit 15 is 1.7. So the filament is easy to brake without adding special method.

Figure 10:
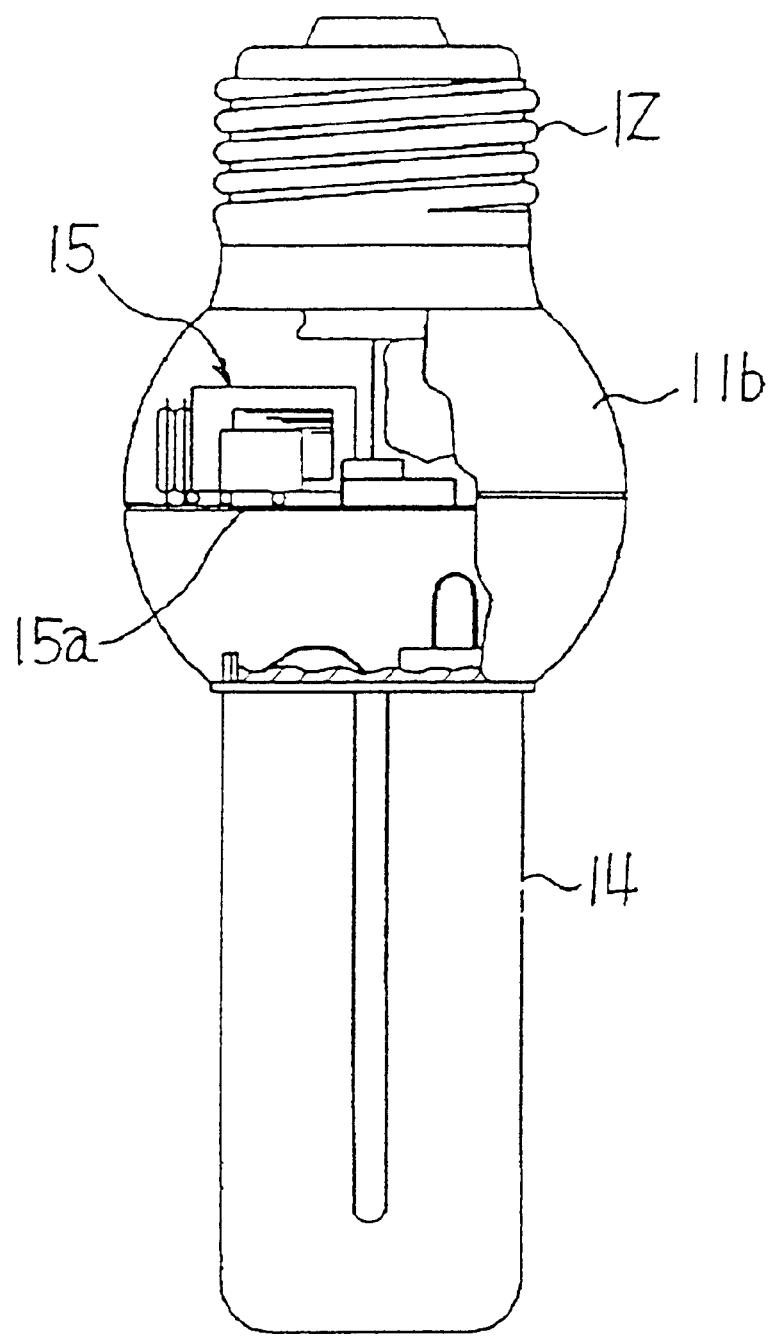
FIG. 10 is a front view, partially in section, of a sixth embodiment of a self ballasted fluorescent lamp according to the present invention.

A sixth embodiment of the invention is explained with reference to FIG. 10 which is a partially cut away front view.

Lighting circuit 15 is the same as that of the first embodiment. However there is no globe in this embodiment. Fluorescent arc tube 14 has essentially two U-shaped sections. P channel FET SP and N channel FET SN are switches of the half bridge inverter circuit. The self destruct mechanism depends on the ramp voltage rise of the fluorescent arc tube. The rated current of one switch is made smaller than the rated current of the other switch so that one switch may be destroyed prior to the arc tube 14 being destroyed. A resin, such as the silicone (not shown), is put on P channel FET SP. When P channel FET SP breaks, the resin prevents fragments from dispersing. The rated characteristics of P channel FET SP and N channel FET SN are as follows. FET SP: VDSS=200 V,ID=3.1A, RDS=1.2 ohm. FET SN: VDSS=200 V,ID=4.6A, RDS=0.5 ohm. VDSS is the voltage-proof between drain and sources. ID is permission current. RDS is the ON resistance.

P channel FET SP serves as the "low" rated device. If the fluorescent arc tube experiences a half wave discharge, the voltage will ramp up and asymmetrical DC current from the half wave discharge will flow to the switch. The drain current of the switch and the timing of on-off of the switches shift. This stress generates heat at the switch. If the asymmetrical current becomes large, there is much heat generated. The asymmetrical current becomes so large that the channel of FET SP is destroyed. Because the rated current of FET SN is high, it has a small resistance. Resonance voltage will become high if the resistance of the resonance circuit is small. Because the inverter circuit is a resonance circuit, resonance voltage becomes high. Resonance voltage becomes the starting voltage. Starting voltage should be made high when using an N channel FET SN to operate the lamp which needs a high starting voltage.

Figure 11:
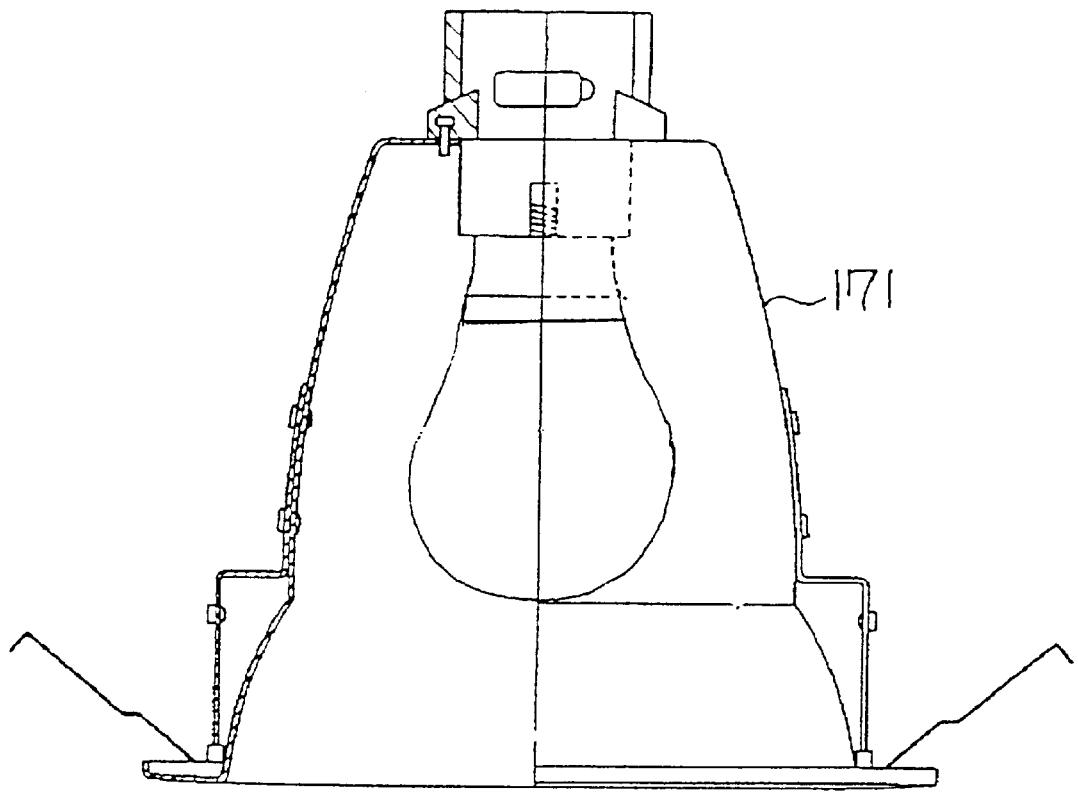
FIG. 11 is a view, sectional partially schematic, of a embodiment of a lighting fixture according to the present invention.

FIG. 11 shows an embodiment of a lighting fixture according to the present invention. The lighting fixture main part 171 includes a socket connected to a cone-shaped aluminum reflector. The self ballasted fluorescent lamp is the same as that shown in FIG. 8. The base of the self ballasted fluorescent lamp is inserted in the socket, and is supported by the lighting fixture main part 171.

The following descriptions apply to various of the specific embodiments described above. Unless otherwise specified, definitions of terms and technical meanings are as shown below.

A self ballasted fluorescent lamp should have a rated service power of no more than 35 W, as set forth in the IEC standard. However, the lamp may exceed a rated power of 35 W. Commercial AC current, voltage or power refers to the power generally available in a home, i.e. AC power supplied by power companies having a frequency of 60 Hz. and an effective voltage of about 120 V in the U.S. The circuits for self ballasted fluorescent lamps which are used abroad need to be adjusted to apply the principles of this invention.

Although rectification circuits having a diode bridge and a shaping circuit are common, other rectification circuits can be used in the present invention.

Although an electrolytic capacitor is suitable as the smoothing capacitor, any type of capacitor can be employed in this invention. A high frequency generating circuit changes DC current into a high frequency current. "High frequency" means a frequency of about 1000 Hz or more. This invention can be used with a hot cathode type or cold cathode type fluorescent lamp. Moreover, the fluorescent lamp of the present invention may use an emitter applied to the electrode, a ceramic electrode, or a cold cathode with thermal spraying.

Rated service power W of a self ballasted fluorescent lamp refers to the power consumed by the entire self ballasted fluorescent lamp including the high frequency generating circuit. The high frequency generating circuit can generate a high frequency current with or without a DC offset. The form of the high frequency current and the rated power can be arbitrarily selected. A ballast is required to compensate for the negative impedance characteristic of the fluorescent lamp and may be, for example, an inductance connected in series with the fluorescent lamp as a current-limiting impedance.

When using an inductance as a current-limiting impedance, a small feedback element can be included in the form of a magnetic element in combination with an auxiliary winding of the impedance. The auxiliary winding is a part of the drive circuit which controls a switching element which causes the high frequency generating circuit to oscillate, by supplying energy for self-oscillation. However, any feedback element may be employed. In fact, the feedback element is not necessary. Moreover, a series resonance circuit which includes the current-limiting inductance can be added, and the operating frequency of the high frequency generator can be regulated.

Furthermore, the fluorescent lamp may be connected to the AC commercial power source through an isolation transformer. However, the fluorescent lamp can be connected without using the insulation transformer. This effectively miniaturizes the self ballasted fluorescent lamp. In addition, when connecting directly, it is good to use a coupling capacitor in series with the fluorescent lamp to eliminate DC current flowing to the fluorescent lamp from the AC commercial power source.

When using a hot cathode filament for the electrode of the fluorescent lamp, either of two different methods can be used to heat the filament electrode during starting. The first method includes connecting a resonance capacitor in parallel with the fluorescent lamp through at least one filament electrode during starting. Then, since the current through the current-limiting inductance and the resonance capacitor also flows through the filament during starting, the filament is heated. Since the current-limiting inductance and the resonance capacitor resonate relatively well, the voltage across the resonance capacitor becomes high, starting the fluorescent lamp.

The second method for heating the filament during starting uses a transformer. Although the filament heating transformer may be formed apart from the current-limiting inductance, the current-limiting inductance can be magnetically coupled to a filament heating winding. This minimizes the number of necessary parts. Either one or both filament electrodes do not need to be heated before starting the lamp and in fact, do not need to be heated at all.

The lamp used for this invention is intended to be screwed into standard sockets used for incandescent electric bulbs and the like. For examples, screw base (international title E), bayonet base (international title B), shell base (international title S), pin base (international titles F and G), etc. can be used.

The base is formed of insulating material, such as plastic, and it can be either transparent or not transparent. However, it must be able to withstand heat generated during operation of the lamp.

The switch is an inverter circuit oscillated by repeated on-off operating semiconductor devices such as, for examples, field effect transistors, bipolar transistors, and thyristors. The switch itself may be arranged to self-destruct in the presence of current exceeding desired limits at the end of life of the discharge tube.

The fluorescent arc tube itself can be shaped in various form factors. The important feature for this invention is that at least one of the tube's electrodes be positioned with respect to the self ballast power supply so that heat is transferred to at least one temperature sensitive element of the power supply.

The maximum outside diameter of the circuit board refers, in the case of a circular circuit board to its diameter, and, in the case of an odd shape board to its maximum width.

When attaching the fluorescent arc tube to its base, it's maximum width sectional intersects perpendicularly the direction of attachment. For example, when it is the fluorescent arc tube by which the discharging gap was formed among a pair of electrodes, it is the maximum width of the bulb outside sides of the sectional which intersects perpendicularly with the longer side of the bulb. Two or more direct tubular bulb ends can arrange "U" letter-like bulb in parallel, and can form the long discharging gap among a pair of electrodes.

It is best for the circuit board to have a width that is substantially the same as the maximum width of the fluorescent arc tube. The objective is for there to be heat transfer from a tube electrode to the power supply circuit. Any physical arrangement that permits this will be effective. An effective arrangement is for the circuit board to have one or more holes therein. At least a portion of the tube passes through such a hole in its final assembled condition. This permits a tube electrode to be in close proximity to the power supply circuit. If the diameter of the maximum of the circuit board exceeds 10% to the maximum width of the fluorescent arc tube, self ballasted fluorescent lamp will be too large, and there may be insufficient heat transfer. Therefore it is desirable that the diameter of the maximum of the circuit board carries out to +10% from −10% to the maximum width of the fluorescent arc tube. If there is sufficient heat transfer, the switching element of the power supply responsive to the heat responds quickly and the tube is shut off early before any danger exists at the end of tube life.

Various self-destruct arrangements are taught herein. One arrangement uses a switch positioned near the end of the fluorescent arc tube. Another arrangement uses an electrolytic capacitor (C2 in FIGS. 1 and 9) which generates the DC component of the AC driving voltage that is input to the switch circuit of the ballast. This capacitor is arranged near the fluorescent arc tube so that it receives heat generated from it. The capacitor is made of a substance that cannot withstand temperatures above a predetermined temperature. Breakdown of the capacitor effectively causes the switch to stop operating and the ballast is effectively stopped with certainty. The electrolytic capacitor is designed such that when it reaches a predetermined temperature, it fails in a manner that it becomes electrically open between its terminals. Because the switch sees a high voltage when the terminals of the electrolytic capacitor becomes open, the switch is easily destroyed. Thus such a circuit arrangement effectively acts as a fuse and prevents harm at the end of life of the discharge tube.

While the invention has been described in connection with what are presently considered to be the most practical and preferred embodiments, it is to be understood that the invention is not limited to the disclosed embodiments. On the contrary, it is intended to cover various modifications and equivalent arrangements included within the spirit and scope of the appended claims.

What is claimed is:

1. A self-ballasted fluorescent lamp comprising:
   a fluorescent arc tube having a U-shaped portion and a pair of electrodes located at each end of the fluorescent arc tube;
   a vessel having a base, said vessel supporting both ends of the fluorescent arc tube; and
   a ballast power supply including a plurality of inverter circuit parts which are mounted on a printed circuit board, the printed circuit board attaching in the vessel so that ends of the fluorescent arc tube may be covered, the ballast power supply providing high frequency power to the fluorescent arc tube, the inverter circuit parts including a self-destruct switch element located near the ends of the fluorescent arc tube so as to receive heat from the pair of electrodes, the switch element self-destructs when its temperature exceeds a predetermined threshold, the ballast power supply being arranged such that when the switch element self destructs, power to the fluorescent arc tube is shut off, wherein said inverter circuit parts include a half-bridge inverter circuit, said half-bridge inverter circuit accommodated in the base, which operates the fluorescent arc tube, and has two switch elements, one of which has a rated current that is less than the other, the smaller rated current switch element being the self-destructing one that is destroyed by over-current at the end of life of the fluorescent arc tube, thereby disabling the inverter circuit and removing power from the fluorescent arc tube at the end of its life.

2. A self-ballasted fluorescent lamp comprising:

a fluorescent arc tube having a U-shaped portion and a pair of electrodes located at each end of the fluorescent arc tube;

a vessel having a base, said vessel supporting both ends of the fluorescent arc tube; and a ballast power supply comprising a plurality of inverter circuit parts, said inverter circuit parts including a half-bridge inverter circuit, said inverter circuit parts are mounted on a printed circuit board, the printed circuit board attaching in the vessel so that all ends of the fluorescent arc tube may be covered, the ballast power supply providing high frequency power to the fluorescent arc tube, said inverter circuit parts further including a self-destruct switch element of the half-bridge inverter circuit, the self-destruct switch element located near the ends of the fluorescent arc tube side of said printed circuit board so as to receive heat from the pair of electrodes, the switch element self-destructs when its temperature exceeds a predetermined threshold, the ballast power supply being arranged such that when the switch element self destructs, power to the fluorescent arc tube shuts off.

3. A lamp according to claim 2 wherein the semiconductor switch element is a field effect transistor (FET).

4. A lamp according to claim 2, wherein the ballast power supply comprises a circuit board positioned in close proximity to the arc tube and the diameter of the circuit board is within the range of +/−10% of the maximum width of the fluorescent arc tube.

5. A lamp according to claim 2 wherein the self-destruct circuit element is a capacitor and a switch element.

6. A self ballasted fluorescent lamp as set forth in claim 2, wherein, the ballast power supply comprises a complementary switch circuit including a P channel type FET and an N channel type FET, and the self-destruct element is the P channel type FET.

7. A self ballasted fluorescent lamp as set forth in claim 2, wherein the ballast power supply comprises a resonance circuit in series connection with the electrode.

8. A self ballasted fluorescent lamp as set forth in claim 2, further comprising an arrangement for pre-heating a tube electrode and wherein the ballast power supply has a crest factor of 1.7.

9. A self ballasted fluorescent lamp as set forth in claim 2, further comprising a base having a globe covering at least part of the fluorescent arc tube.

* * * * *